United States Patent
Miyagi et al.

(10) Patent No.: US 8,179,474 B2
(45) Date of Patent: May 15, 2012

(54) FAST ITERATIVE MOTION ESTIMATION METHOD ON GRADUALLY CHANGING IMAGES

(75) Inventors: Kensuke Miyagi, Cupertino, CA (US); Pingshan Li, Sunnyvale, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 317 days.

(21) Appl. No.: 12/553,021

(22) Filed: Sep. 2, 2009

(65) Prior Publication Data

US 2011/0050930 A1    Mar. 3, 2011

(51) Int. Cl.
*H04N 11/02*    (2006.01)
*H04N 5/14*    (2006.01)
*H04N 7/12*    (2006.01)

(52) U.S. Cl. ............. 348/416.1; 348/699; 375/240.16

(58) Field of Classification Search ............ 348/416.1, 348/699; 375/240.16; 382/236
See application file for complete search history.

(56) References Cited

U.S. PATENT DOCUMENTS

| | | | |
|---|---|---|---|
| 5,565,922 A * | 10/1996 | Krause | 375/240.14 |
| 6,418,166 B1 | 7/2002 | Wu et al. | |
| 6,658,059 B1 | 12/2003 | Iu et al. | |
| 6,690,728 B1 * | 2/2004 | Chang et al. | 375/240.16 |
| 6,738,497 B2 * | 5/2004 | Van Overveld et al. | 382/107 |
| 7,006,157 B2 * | 2/2006 | Sohn | 348/699 |
| 7,072,398 B2 | 7/2006 | Ma | |
| 7,894,526 B2 * | 2/2011 | Kadono et al. | 375/240.16 |

OTHER PUBLICATIONS

Michael J. Black, "Combining Intensity and Motion for Incremental Segmentation and Tracking Over Long Image Sequences*", National Aeronautics and Space Administration (NGT-20749 and NASA RTOP 506-47), by ONR Grant N00014-91-J-1577, and by a grant from the Whitaker Foundation, pp. 485-493, Department of Computer Science, Yale University, P.O. Box 2158 Yale Station, New Haven, CT 06520-2158, USA.

* cited by examiner

*Primary Examiner* — Timothy J Henn
(74) *Attorney, Agent, or Firm* — Haverstock & Owens LLP (57) ABSTRACT

A fast iterative motion estimation method enables motion estimation to take place with fewer computations. The motion estimation and error determination steps are combined, each position in the search area is monitored to determine whether error value reaches the minimum over iterations by keeping track of convergence status, a refinement search is applied (thus, a smaller search area than a conventional process), and the difference of the error value and the minimum error value is used for each position in the search area to decide whether to further calculate the error value for that position. Each of these modifications helps minimize the number of computations used in motion estimation.

47 Claims, 8 Drawing Sheets

FAST ITERATIVE MOTION ESTIMATION METHOD ON GRADUALLY CHANGING IMAGES

FIELD OF THE INVENTION

The present invention relates to the field of video processing. More specifically, the present invention relates to motion estimation.

BACKGROUND OF THE INVENTION

Figure 1:
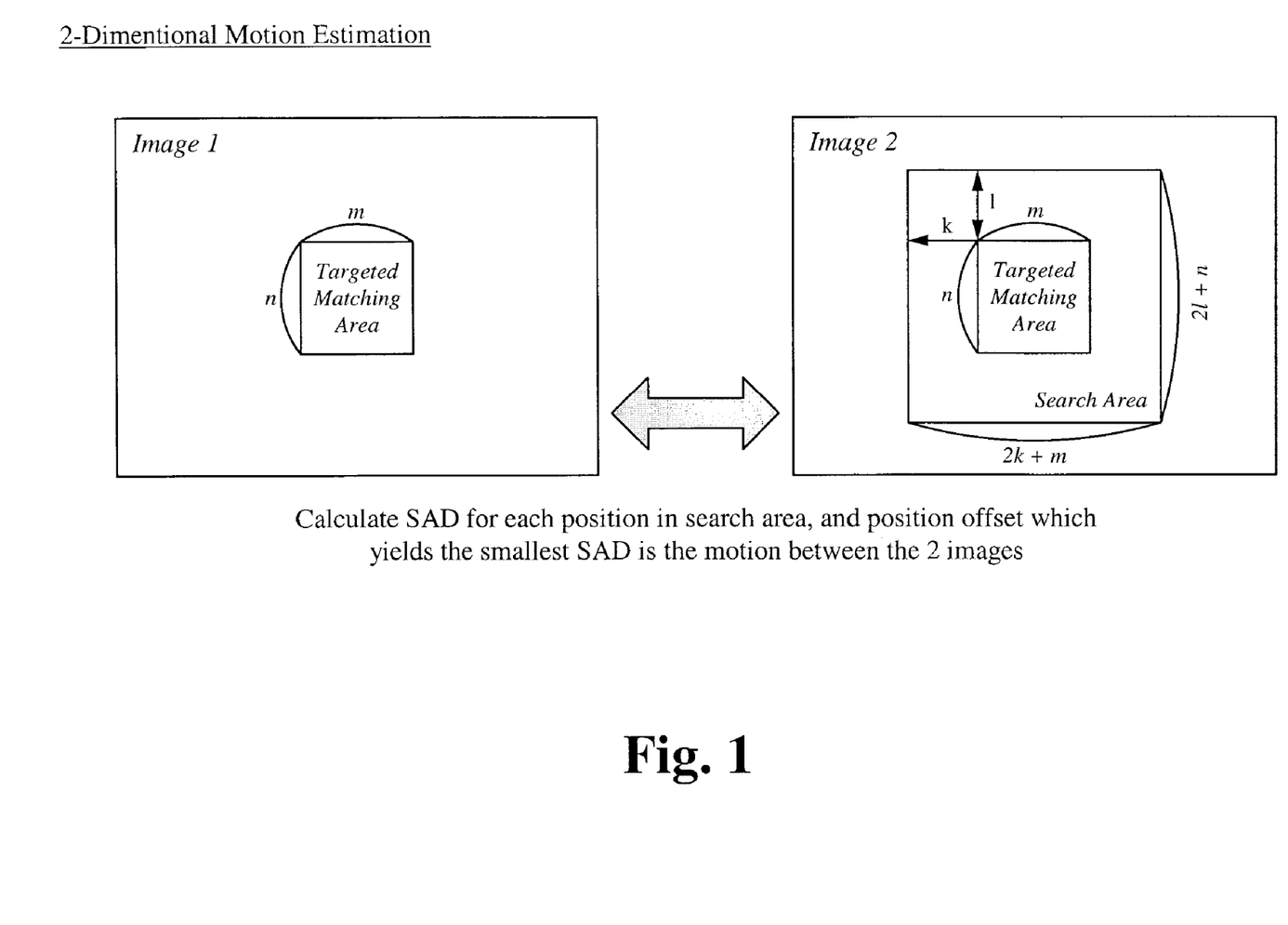
FIG. 1 illustrates a diagram of 2-dimensional motion estimation.

Motion estimation is a widely used technique to find or estimate the motion in image processing. For example, if there are two 2-dimensional images, in order to find a motion between these two images, a Sum of Absolute Differences (SAD) calculation is able to be applied on an m×n matching area with a search range of +/−k and +/−l in horizontal and vertical directions respectively, and then the position which yields the smallest SAD is able to be found. FIG. 1 illustrates an example of 2-dimensional motion estimation.

SUMMARY OF THE INVENTION

A fast iterative motion estimation method enables motion estimation to take place with fewer computations. The motion estimation and error determination steps are combined, each position in the search area is monitored to determine whether error value reaches the minimum over iterations by keeping track of convergence status, a refinement search is applied (thus, a smaller search area than a conventional process), and the difference of the error value and the minimum error value is used for each position in the search area to decide whether to further calculate the error value for that position. Each of these modifications helps minimize the number of computations used in motion estimation.

In one aspect, a method of estimating motion implemented on a device comprises calculating a first combined motion estimation between a first image and a second image including generating a table of error values, applying a compensating factor to compensate a content of the first image to the second image, calculating an additional combined motion estimation including a current error value of a position using the compensating factor and determining if a previous error value of the position is greater than the current error value of the position, and if the previous error value is greater than the current error value then repeating applying a compensating factor, calculating an additional combined motion estimation and determining if a previous error value of the position is greater than the current error value of the position, and if the previous error value is less than or equal to the current error value then a match is found. Calculating the additional combined motion estimation further includes monitoring each position in a search area to determine if the error value reaches a minimum, and if the error value reaches the minimum, the error calculation for the position stops. A refinement search is applied when calculating the additional combined motion estimation. The refinement search utilizes a search area smaller than a conventional search area. Calculating the additional combined motion estimation further includes determining if a difference of the error value and a minimum error value is greater than a maximum difference, and if the difference is greater than the maximum difference, the error calculation for the position stops. The table of errors is for all positions in a search range. A monitoring table is utilized when calculating the additional combined motion estimation, and the monitoring table includes convergence status for each corresponding position, wherein the convergence status determines if a calculated error is bigger than a previous calculated error, and if the calculated error is bigger than the previous calculated error, the error calculation for the position stops. The compensating factor includes a blurring difference. The content includes an intensity, a contrast or a blurriness. The device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television and a home entertainment system.

In another aspect, a system implemented on a device for estimating motion comprises a combined motion estimation module for determining a motion vector and determining an error value, a compensation module operatively coupled to the combined motion estimation module, the compensation module for compensating an image for content changes so that a first image and a second image match and a determining module operatively coupled to the compensation module, the determining module for determining if a previous error is greater than a current error value and stopping if the previous error value for a position is less than or equal to the current error value and continuing if the previous error value is greater than the current error value. The combined motion estimation module is further configured for monitoring each position in a search area to determine if the error value reaches a minimum, and if the error value reaches the minimum, the error calculation for the position stops. The combined motion estimation module is further configured for applying a refinement search. The refinement search utilizes a search area smaller than a conventional search area. The additional combined motion estimation module is further configured for determining if a difference of an error value and a minimum error value is greater than a maximum difference, and if the difference is greater than the maximum difference, the error calculation for the position stops. The combined motion estimation module is further configured for utilizing a monitoring table which includes convergence status for each corresponding position, wherein the convergence status determines if a calculated error is bigger than a previous calculated error, and if the calculated error is bigger than the previous calculated error, the error calculation for the position stops. The compensating factor includes a blurring difference. The content includes an intensity, a contrast or a blurriness. The device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television and a home entertainment system.

In another aspect, a device comprises a memory for storing an application, the application for calculating a first combined motion estimation between a first image and a second image including generating a table of error values, applying a compensating factor to compensate a content of the first image to the second image, calculating an additional combined motion estimation including a current error value of a position using the compensating factor and determining if a previous error value of the position is greater than the current error value of the position, and if the previous error value is greater than the current error then repeating applying a compensating factor, calculating an additional combined motion estimation and determining if a previous error value of the position is greater than the current error value of the position, and if the previous error value is less than or equal to the current error value then a match is found and a processing component coupled to the memory, the processing component configured for processing the application. Calculating the additional combined motion estimation further includes monitoring each position in a search area to determine if an error value reaches a minimum, and if the error value reaches the minimum, the error calculation for the position stops. A refinement search is applied when calculating the additional combined motion estimation. The refinement search utilizes a search area smaller than a conventional search area. Calculating the additional combined motion estimation further includes determining if a difference of an error value and a minimum error value is greater than a maximum difference, and if the difference is greater than the maximum difference, the error calculation for the position stops. The table of errors is for all positions in a search range. A monitoring table is utilized when calculating the additional combined motion estimation, and the monitoring table includes convergence status for each corresponding position, wherein the convergence status determines if a calculated error is bigger than a previous calculated error, and if the calculated error is bigger than the previous calculated error, the error calculation for the position stops. The compensating factor includes a blurring difference. The content includes an intensity, a contrast or a blurriness. The device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television and a home entertainment system.

In yet another aspect, a video capture device comprises a memory for storing an application, the application for determining a first motion vector and generating a table of error values between a first image and a second image of a video, applying a compensating factor to compensate a content of the first image to the second image, calculating an additional motion vector including a current error value of a position using the compensating factor and determining if a previous error value of the position is greater than the current error value of the position, and if the previous error value is greater than the current error then repeating applying a compensating factor, calculating an additional motion vector and determining if a previous error value of the position is greater than the current error value of the position, and if the previous error value is less than or equal to the current error value then a match is found, a processing component coupled to the memory, the processing component configured for processing the application and a storage component for storing the video.

In another aspect, a digital still camera comprises an image and video acquisition component for acquiring images and videos, a memory for storing an application, the application for: determining a first motion vector and generating a table of error values between a first image and a second image of a video, applying a compensating factor to compensate a content of the first image to the second image, calculating an additional motion vector including a current error value of a position using the compensating factor and determining if a previous error value of the position is greater than the current error value of the position, and if the previous error value is greater than the current error then repeating applying a compensating factor, calculating an additional motion vector and determining if a previous error value of the position is greater than the current error value of the position, and if the previous error value is less than or equal to the current error value then a match is found, a processing component coupled to the memory, the processing component configured for processing the application and a storage component for storing the images and the videos.

DETAILED DESCRIPTION OF THE PREFERRED EMBODIMENT

Figure 2:
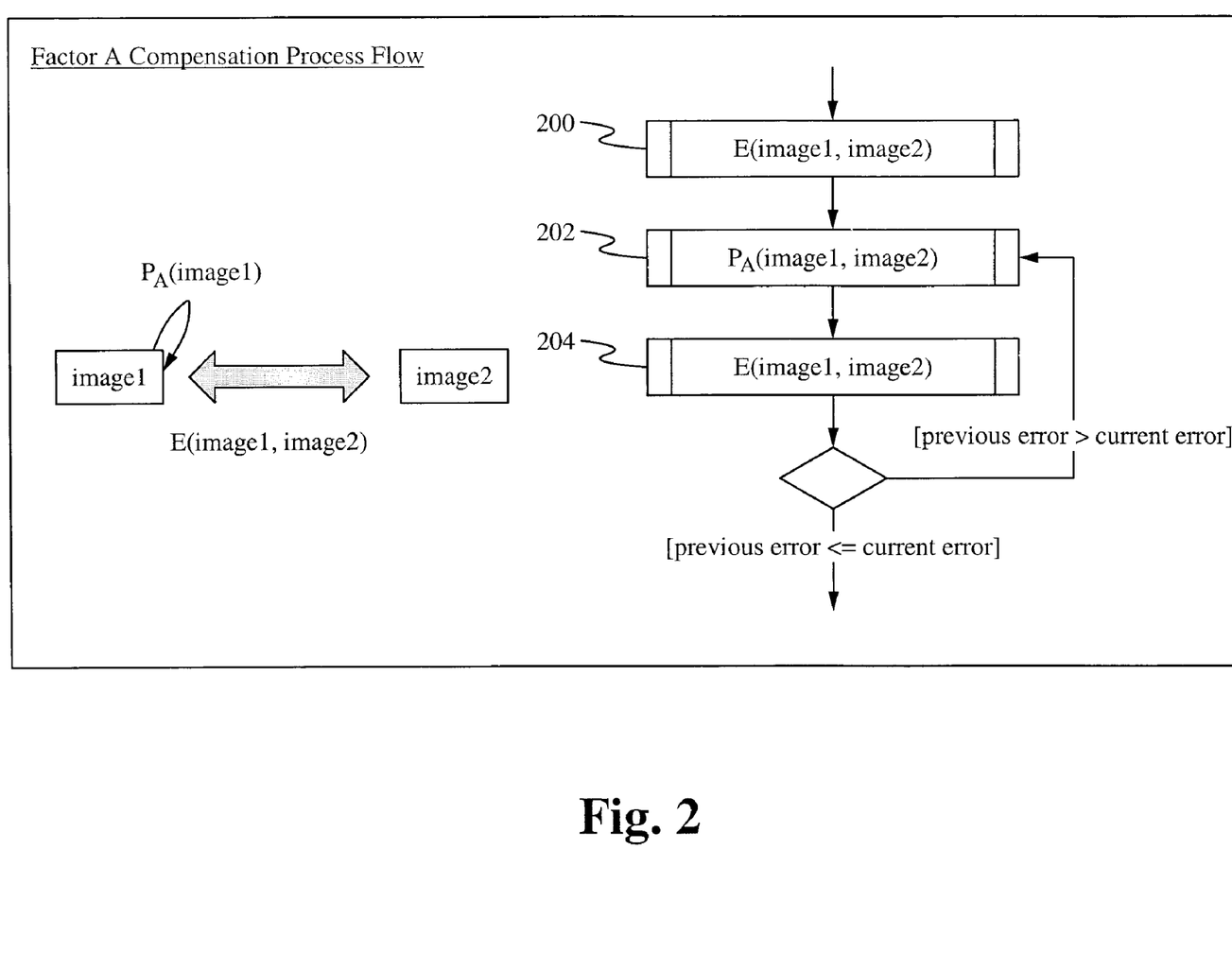
FIG. 2 illustrates a diagram of compensation.

In a video, the content of an image is gradually changing over time, for example, from one scene to the next. The content is able to be intensity, contrast, blurriness and/or other content. To perform motion estimation, the goal is to match the two images over time. The changes are able to be modeled as a compensation process. For example, there is a factor A (e.g., intensity) that is compensated, and then a compensation $P_A(image1)$ is generated, which is applied to image1 to compensate the factor A gradually. The change is finished once a match is found. The matching criteria is able to be implemented using the error measures between the two images, E(image1, image2). For example, in some cases, $P_A(image1)$ has to be applied 3 times for the factor A to be nicely compensated, but in other cases, $P_A(image1)$ is applied 10 times for the factor A to be nicely compensated. The number of times $P_A$ that (image1) is applied varies depending on how much factor A needs to be compensated between the two images. FIG. 2 shows a Factor A compensation process flow. In the step 200, an error is calculated. In the step 202, a compensation is applied. In the step 204, an error is calculated again, using the compensation. The process of compensation and error calculation repeats as long as the current error is less than the previous error.

Figure 3:
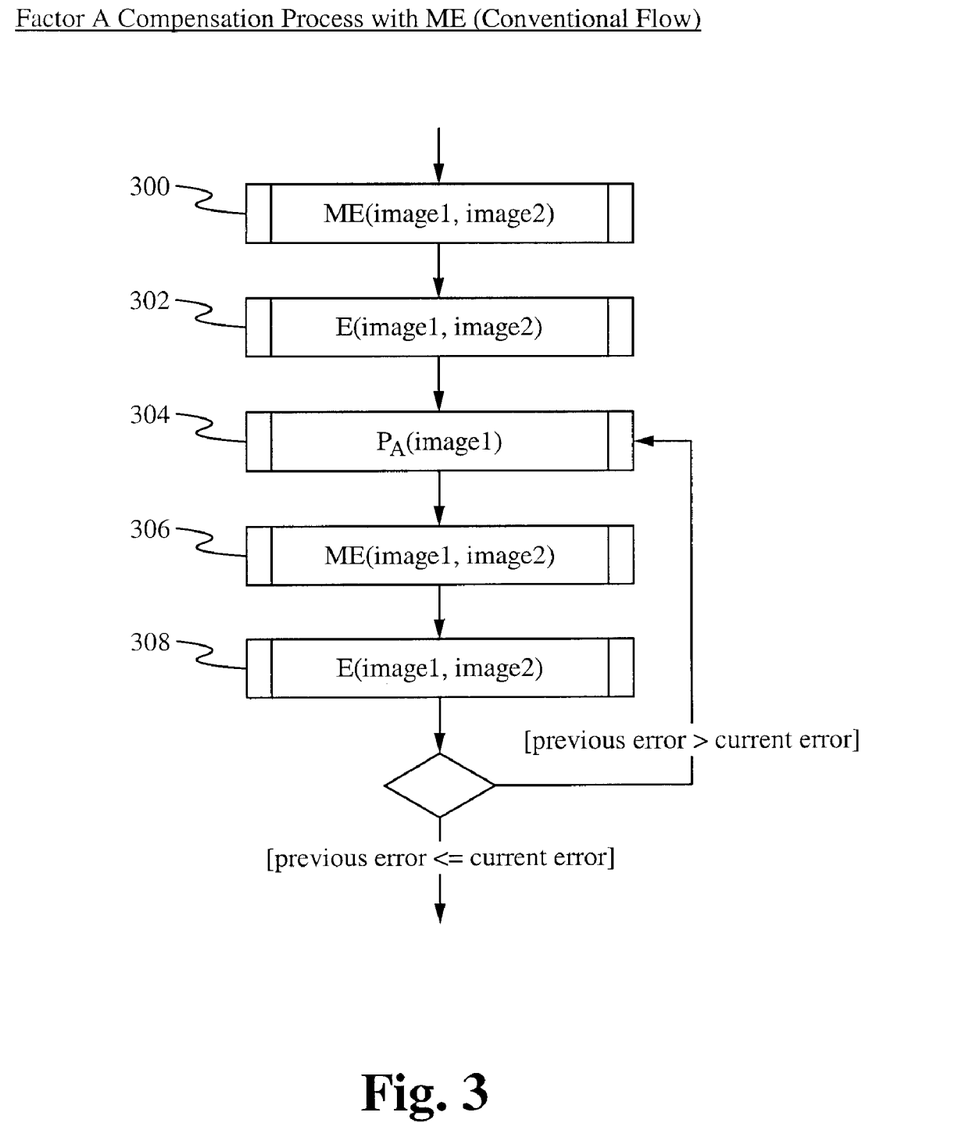
FIG. 3 illustrates a flowchart of a method of a conventional process for motion estimation.

In addition to the factor A compensation process flow, a motion is to be compensated as well. With the motion estimation (ME) along with the factor A compensation, the conventional approach to do this method is implemented as shown in FIG. 3. In the step 300, the ME between image1 and image2 is calculated. In the step 302, an error between image1 and image2 is calculated. In the step 304, a compensation of image1 is applied. In the step 306, the ME between image1 and image2 is calculated again. In the step 308, an error between image1 and image2 is calculated again. The process of compensation and error calculation repeats as long as the current error is less than the previous error.

Assuming there is a case where the steps 304, 306 and 308 in FIG. 3 have to be repeated N times, matching size for ME to be m×n, search area to be +/−k and +/−l in horizontal and vertical direction respectively, the amount of the computation of ME (image1, image2), E (image1, image2) and $P_A$(image1) is C(ME), C(E) and C($P_A$), respectively. The estimated amount of the computations are able to be shown as Equation (1).

$$C(\text{Total})=C(\text{ME})+C(E)+N\times(C(P_A))+C(\text{ME})+C(E)) \quad (1)$$

Moreover, letting C(ME_Err) be the amount of computations for matching in each position in the search area, Equation (1) is able to be shown as Equation (2).

$$C(\text{Total})=(k+k+1)^*(l+l+1)^*C(\text{ME\_Err})+C(E)+N^*(C(P_A)+(k+k+1)^*(l+l+1)^*C(\text{ME\_Err})+C(E)) \quad (2)$$

The problem with this is that the ME cycle will be significant due to the iteration of steps 304, 306 and 308 in FIG. 3, and $P_A$ (image1) needs to be applied for the entire search area.

The fast iterative motion estimation method described herein reduces the amount of computations by several steps. To reduce the ME cycle, ME(image1, image2) and E(image1, image2) are combined. To reduce the combined_ME(image1, image2) cycle, each position in the search area is monitored of whether error value reaches the minimum over iterations by keeping track of convergence status. To reduce the combined_ ME(image1, image2) and $P_A$(image1) cycle, a refinement search is applied for ME(image1, image2) around the motion vector found. To further reduce the ME cycle, the difference of ME_Err and the minimum error value is used for each position in the search area to decide whether to further calculate ME_Err for that position.

Figure 4:
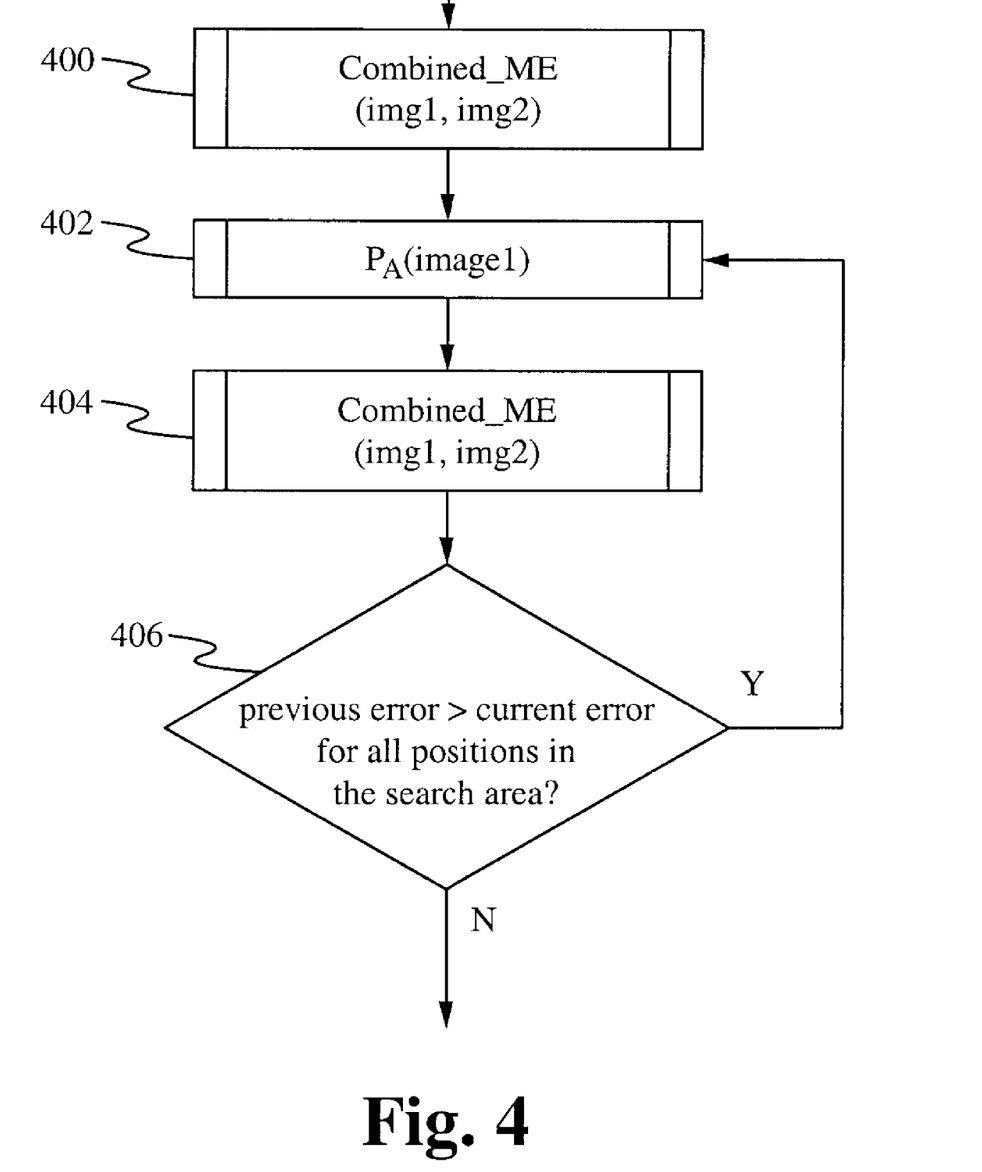
FIG. 4 illustrates a flowchart of a method of an improved process for motion estimation according to some embodiments.

FIG. 4 illustrates a flowchart of a method of fast iterative motion estimation according to some embodiments. In the step 400, a Combined_ME (img1, img2) is calculated. In the step 402, a compensating component or factor, $P_A$, is applied. The compensating component is applied to an image to match a second image. The compensating component is able to be any filter such as blurring. In the step 404, a Combined_ME (img1, img2) is calculated using the compensating component, $P_A$. In the step 406, it is determined if the previous error is greater than the current error for all of the positions in the search area. If the previous error is greater than the current error, then the process loops back to the step 402. If the previous error is less than or equal to the current error, then the process ends. Additional steps are able to be included as well. The steps of the method are described further herein.

Combined ME and Error Calculation

The error calculation method used in the step 302 which is the same as the error calculation of step 308 is able to be used for error calculation for motion estimation error, ME_ERR. In the conventional flow (shown in FIG. 3), the step 300 determines motion information such as a motion vector, which is used in the step 302 to generate the error values. The output will then be one motion vector and one error value. In the improved method, in the step 400, Combined_ME(img1, img2) generates a table of error values (Error Table) for all of the positions in the search range. For example, if the search range is +/−k and +/−l in the horizontal and vertical direction respectively, there will be (m+m+1)*(l+l+1) error values, by which the computations of the step 302 are able to be eliminated.

Monitoring Convergence Status for Each Position in Search Area

While the iteration process of $P_A$(image1) and Combined_ME (img1, img2) is conducted, a position in the search area is considered to be converged when a calculated error becomes bigger than the previously calculated error.

Figure 5:
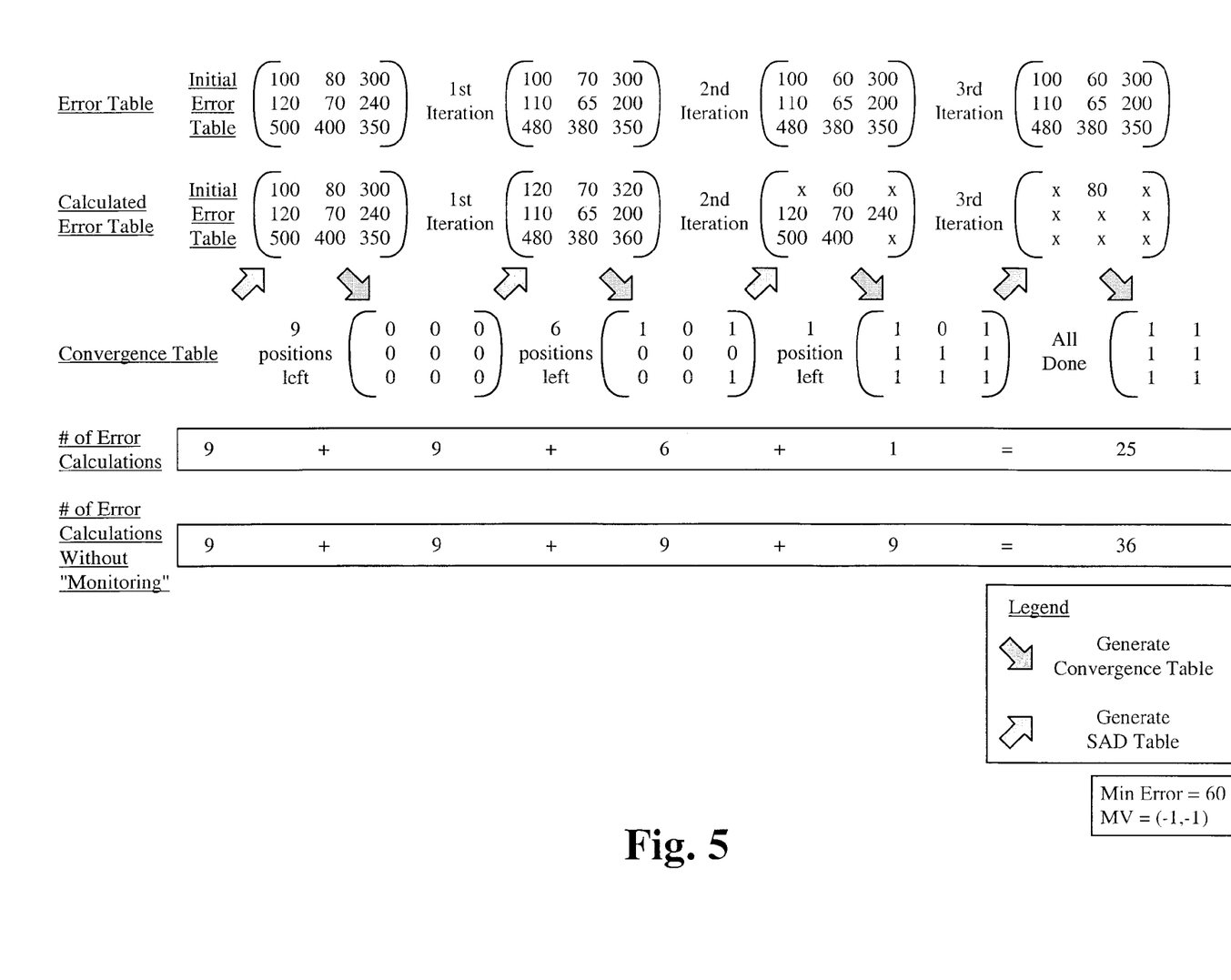
FIG. 5 illustrates an exemplary comparison of the reduction of number of error calculations by monitoring convergence status according to some embodiments.

A way to monitor the convergence status for each position in the search area is to implement a table (e.g. a convergence table) with the same number of elements as the Error Table, each of which indicate the convergence status for the corresponding position. FIG. 5 shows the advantage of the monitoring convergence status for a +/−1 pixel search in both the horizontal and vertical directions, in which the size of the Error Table becomes 3×3. As shown in FIG. 5, when an error value of the current iteration is greater than the error value of the previous iteration for a position, then the error calculation for that position is able to be skipped in future iterations. The convergence table is able to be used to indicate which positions are still to be calculated in future iterations where, for example, a binary value such as 0 indicates the need to perform calculations in the next iteration and a 1 indicates to stop. In the example shown in FIG. 5, the number of error calculations is reduced to 25 from 36.

Applying Refinement Search

In the situation where $P_A$(image1) has a small impact on the result of ME, for example, if the motion vector found initially is different from the motion vector found after several iterations by less than a few pixels (coordinates), the number of motion error calculations is reduced significantly by applying the refinement search around the initial motion vector. For example, if there is a +/−32 search range in both horizontal and vertical direction, if an ME is performed in this search range, which has (32+32+1)*(32+32+1)=4,225 error calculation points, it will require 4,225*(N+1) error calculations when the iteration number is N.

However, by applying the refinement search with, for example, +/−2 pixels in both horizontal and vertical direction, this results in (2+2+1)*(2+2+1)=25 calculation points around the motion vector that is found at the initial ME. Thus, for the case when the iteration number is N, the result is 4,225+25*N, which is significantly less than 4,225N.

As a secondary benefit of this refinement search, the target area to apply $P_A$(image1) is able to be reduced significantly, which yields more reduction in computations.

Figure 6:
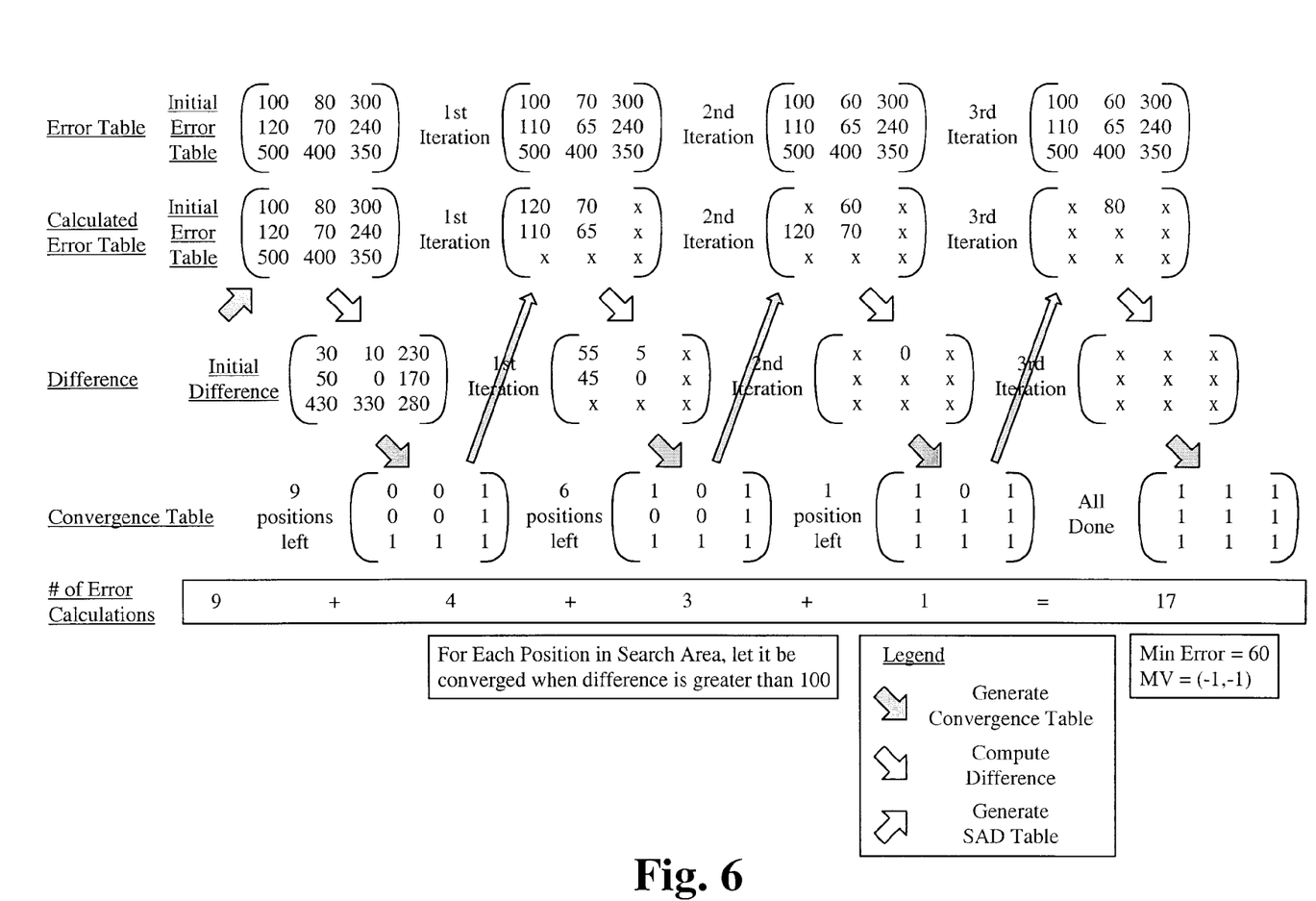
FIG. 6 illustrates an exemplary reduction of the number of error calculations by using the difference between error value and minimum error in the search area according to some embodiments.

Further Reduction of the Number of Error Calculations Using Difference Between Error Value and Minimum Error in the Search Area In addition to the refinement search described, the number of error calculations is also able to be reduced by checking the difference between the error value and the minimum error value in the search range. For example, if any position which has the error value more than 100 bigger than the minimum error value in the search area to be converged, the number of error calculations is able to be reduced as shown in FIG. 6. Compared to the example shown in FIG. 5, an additional (25−17)=8 calculations are reduced.

FIG. 6 illustrates an exemplary reduction of the number of error calculations by using the difference between error value and a minimum error in the search area. In the example, the position is viewed as converged when the difference between the error value of the position and the minimum error value of a position in the search area (also referred to as a maximum difference) is greater than 100. Any maximum difference is able to be used, 100 is just an exemplary maximum difference. As shown, initially the calculated error table includes 9 error values with 70 being the minimum. The positions with error values 450, 330, 280, 170 and 230 all have a difference from the minimum value 70 greater than 100, thus they are able to be skipped when doing error calculations which is why the total number of error calculations is 17 instead of 36.

Figure 7:
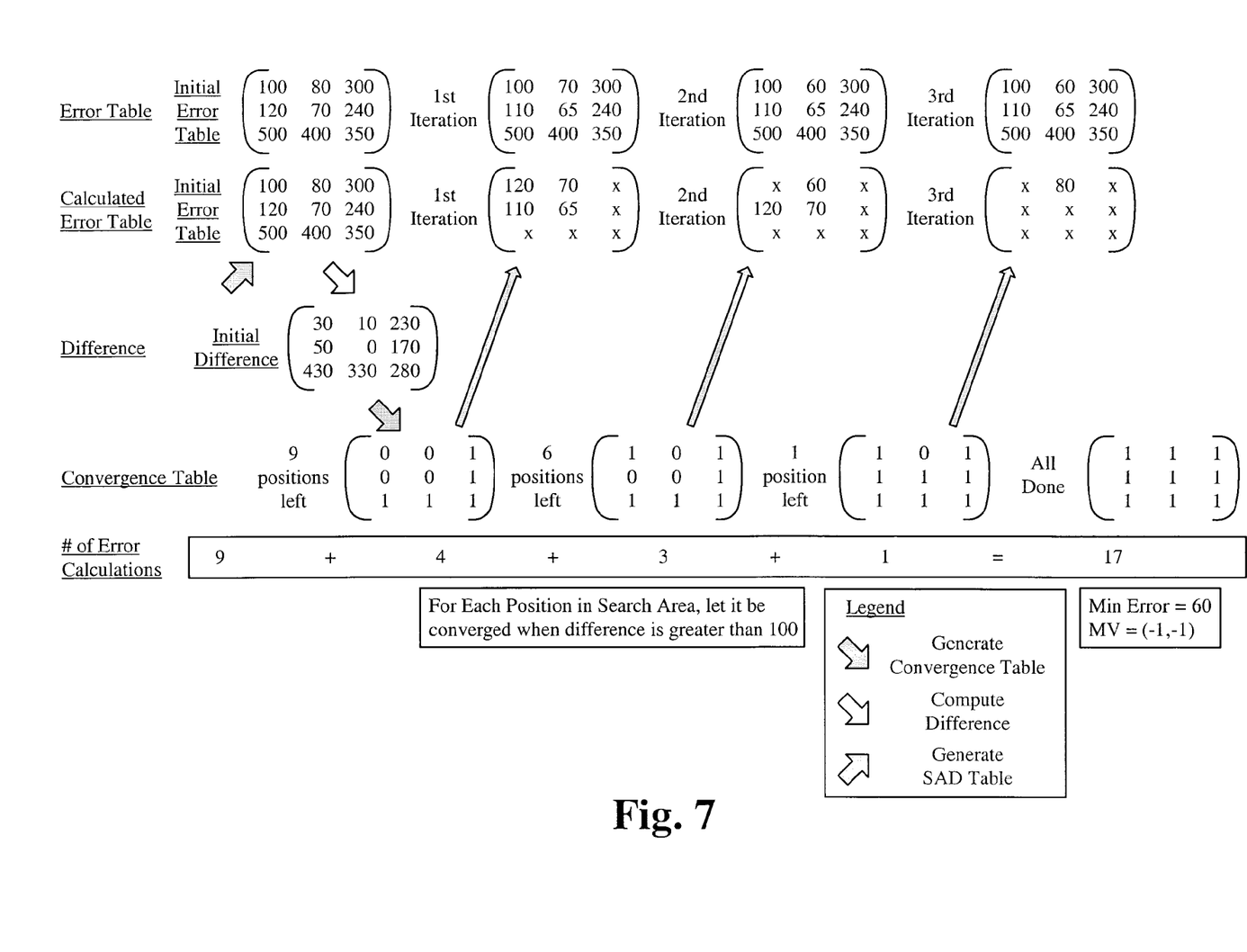
FIG. 7 illustrates an exemplary reduction of the number of error calculations by using the difference between error value and minimum error in the search area according to some embodiments.

FIG. 7 illustrates an exemplary reduction of the number of error calculations by using the difference between error value and minimum error in the search area. FIG. 7 is similar to FIG. 6 with the exception that the difference is checked only after an initial ME is calculated instead of repeatedly checking the difference.

Figure 8:
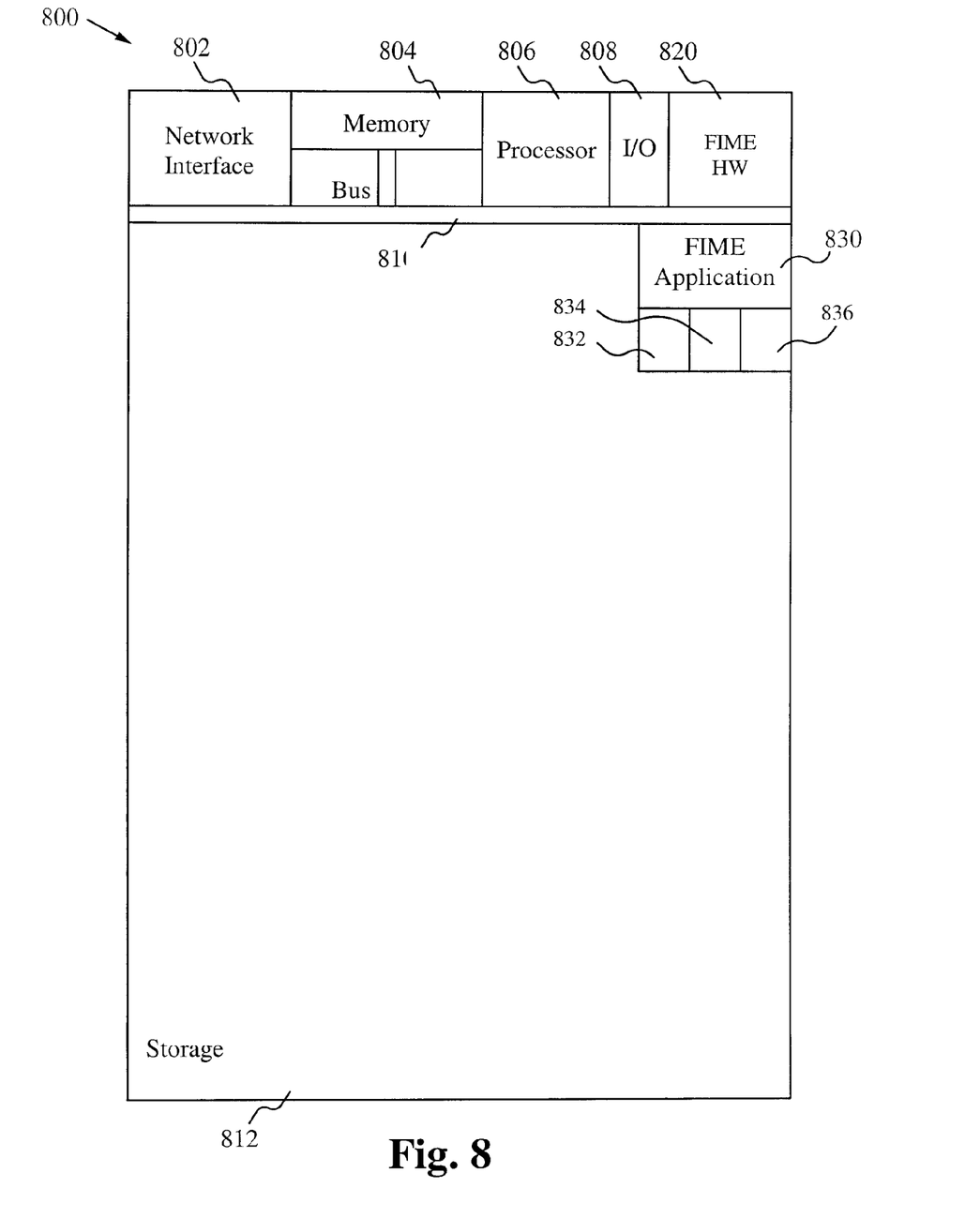
FIG. 8 illustrates a block diagram of an exemplary computing device configured to implement fast iterative motion estimation according to some embodiments.

FIG. 8 illustrates a block diagram of an exemplary computing device 800 configured to implement fast iterative motion estimation according to some embodiments. The computing device 800 is able to be used to acquire, store, compute, communicate and/or display information such as images and videos. For example, a computing device 800 is able to acquire and store a video. The fast iterative motion estimation method is able to be used in acquiring and displaying video on the device 800. In general, a hardware structure suitable for implementing the computing device 800 includes a network interface 802, a memory 804, a processor 806, I/O device(s) 808, a bus 810 and a storage device 812. The choice of processor is not critical as long as a suitable processor with sufficient speed is chosen. The memory 804 is able to be any conventional computer memory known in the art. The storage device 812 is able to include a hard drive, CDROM, CDRW, DVD, DVDRW, flash memory card or any other storage device. The computing device 800 is able to include one or more network interfaces 802. An example of a network interface includes a network card connected to an Ethernet or other type of LAN. The I/O device(s) 808 are able to include one or more of the following: keyboard, mouse, monitor, display, printer, modem, touchscreen, button interface and other devices. Fast iterative motion estimation application(s) 830 used to perform the fast iterative motion estimation method are likely to be stored in the storage device 812 and memory 804 and processed as applications are typically processed. More or less components shown in FIG. 8 are able to be included in the computing device 800. In some embodiments, fast iterative motion estimation hardware 820 is included. Although the computing device 800 in FIG. 8 includes applications 830 and hardware 820 for fast iterative motion estimation applications, the fast iterative motion estimation method is able to be implemented on a computing device in hardware, firmware, software or any combination thereof.

In some embodiments, the fast iterative motion estimation application(s) 830 include several applications and/or modules. In some embodiments, the fast iterative motion estimation application(s) 830 include a combined motion estimation module 832 configured for determining a motion vector and generating an error value and/or a table of error values, a compensation module 834 configured for compensating an image for content changes so that a first image and a second image eventually match and a determining module 836 configured for determining if a previous error is greater than a current error and stopping the process if the previous error for a position is less than or equal to the current error and continuing the process if the previous error is greater than the current error. The modules are also able to include additional abilities such as monitoring for a minimum, applying a refinement search and using the difference of errors to determine whether to continue calculating for a position. In some embodiments, fewer or additional modules are able to be included.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television, a home entertainment system or any other suitable computing device.

To utilize the fast iterative motion estimation method, a user captures a video such as on a digital camcorder or a video player, and while the video is being captured, the fast iterative motion estimation performs motion estimation on the video to capture the video correctly and efficiently. The fast iterative motion estimation occurs automatically without user involvement.

In operation, the fast iterative motion estimation method improves the speed of conventional motion estimation by eliminating unnecessary computations. Specifically, the motion estimation and error determination steps are combined, each position in the search area is monitored to determine whether error value reaches the minimum over iterations by keeping track of convergence status, a refinement search is applied (thus, a smaller search area than a conventional process), and the difference of the error value and the minimum error value is used for each position in the search area to decide whether to further calculate the error value for that position. These improved steps enable calculating a motion vector in fewer computations. Since motion estimation usually relies on an error calculation between two images, motion estimation works better when other factors such as intensity are compensated correctly.

Some Embodiments of Fast Iterative Motion Estimation

1. A method of estimating motion implemented on a device comprising:
   a. calculating a first combined motion estimation between a first image and a second image including generating a table of error values;
   b. applying a compensating factor to compensate a content of the first image to the second image;
   c. calculating an additional combined motion estimation including a current error value of a position using the compensating factor; and
   d. determining if a previous error value of the position is greater than the current error value of the position, and if the previous error value is greater than the current error value then repeating applying a compensating factor, calculating an additional combined motion estimation and determining if a previous error value of the position is greater than the current error value of the position, and if the previous error value is less than or equal to the current error value then a match is found.
2. The method of clause 1 wherein calculating the additional combined motion estimation further includes monitoring each position in a search area to determine if the error value reaches a minimum, and if the error value reaches the minimum, the error calculation for the position stops.
3. The method of clause 1 wherein a refinement search is applied when calculating the additional combined motion estimation.
4. The method of clause 3 wherein the refinement search utilizes a search area smaller than a conventional search area.
5. The method of clause 1 wherein calculating the additional combined motion estimation further includes determining if a difference of the error value and a minimum error value is greater than a maximum difference, and if the difference is greater than the maximum difference, the error calculation for the position stops.
6. The method of clause 1 wherein the table of errors is for all positions in a search range.
7. The method of clause 1 wherein a monitoring table is utilized when calculating the additional combined motion estimation, and the monitoring table includes convergence status for each corresponding position, wherein the convergence status determines if a calculated error is bigger than a previous calculated error, and if the calculated error is bigger than the previous calculated error, the error calculation for the position stops.
8. The method of clause 1 wherein the compensating factor includes a blurring difference.
9. The method of clause 1 wherein the content includes an intensity, a contrast or a blurriness.
10. The method of clause 1 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television and a home entertainment system.
11. A system implemented on a device for estimating motion comprising:
   a. a combined motion estimation module for determining a motion vector and determining an error value;
   b. a compensation module operatively coupled to the combined motion estimation module, the compensation module for compensating an image for content changes so that a first image and a second image match; and
   c. a determining module operatively coupled to the compensation module, the determining module for determining if a previous error is greater than a current error value and stopping if the previous error value for a position is less than or equal to the current error value and continuing if the previous error value is greater than the current error value.
12. The system of clause 11 wherein the combined motion estimation module is further configured for monitoring each position in a search area to determine if the error value reaches a minimum, and if the error value reaches the minimum, the error calculation for the position stops.
13. The system of clause 11 wherein the combined motion estimation module is further configured for applying a refinement search.
14. The system of clause 13 wherein the refinement search utilizes a search area smaller than a conventional search area.
15. The system of clause 11 wherein the additional combined motion estimation module is further configured for determining if a difference of an error value and a minimum error value is greater than a maximum difference, and if the difference is greater than the maximum difference, the error calculation for the position stops.
16. The system of clause 11 wherein the combined motion estimation module is further configured for utilizing a monitoring table which includes convergence status for each corresponding position, wherein the convergence status determines if a calculated error is bigger than a previous calculated error, and if the calculated error is bigger than the previous calculated error, the error calculation for the position stops.
17. The system of clause 11 wherein the compensating factor includes a blurring difference.
18. The system of clause 11 wherein the content includes an intensity, a contrast or a blurriness.
19. The system of clause 11 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television and a home entertainment system.
20. A device comprising:
   a. a memory for storing an application, the application for:
      i. calculating a first combined motion estimation between a first image and a second image including generating a table of error values;
      ii. applying a compensating factor to compensate a content of the first image to the second image;
      iii. calculating an additional combined motion estimation including a current error value of a position using the compensating factor; and
      iv. determining if a previous error value of the position is greater than the current error value of the position, and if the previous error value is greater than the current error then repeating applying a compensating factor, calculating an additional combined motion estimation and determining if a previous error value of the position is greater than the current error value of the position, and if the previous error value is less than or equal to the current error value then a match is found; and
   b. a processing component coupled to the memory, the processing component configured for processing the application.
21. The device of clause 20 wherein calculating the additional combined motion estimation further includes monitoring each position in a search area to determine if an error value reaches a minimum, and if the error value reaches the minimum, the error calculation for the position stops.
22. The device of clause 20 wherein a refinement search is applied when calculating the additional combined motion estimation.
23. The device of clause 22 wherein the refinement search utilizes a search area smaller than a conventional search area.
24. The device of clause 20 wherein calculating the additional combined motion estimation further includes determining if a difference of an error value and a minimum error value is greater than a maximum difference, and if the difference is greater than the maximum difference, the error calculation for the position stops.
25. The device of clause 20 wherein the table of errors is for all positions in a search range.
26. The device of clause 20 wherein a monitoring table is utilized when calculating the additional combined motion estimation, and the monitoring table includes convergence status for each corresponding position, wherein the convergence status determines if a calculated error is bigger than a previous calculated error, and if the calculated error is bigger than the previous calculated error, the error calculation for the position stops.
27. The device of clause 20 wherein the compensating factor includes a blurring difference.
28. The device of clause 20 wherein the content includes an intensity, a contrast or a blurriness.
29. The device of clause 20 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television and a home entertainment system.

30. A video capture device comprising:
  a. a memory for storing an application, the application for:
    i. determining a first motion vector and generating a table of error values between a first image and a second image of a video;
    ii. applying a compensating factor to compensate a content of the first image to the second image;
    iii. calculating an additional motion vector including a current error value of a position using the compensating factor; and
    iv. determining if a previous error value of the position is greater than the current error value of the position, and if the previous error value is greater than the current error then repeating applying a compensating factor, calculating an additional motion vector and determining if a previous error value of the position is greater than the current error value of the position, and if the previous error value is less than or equal to the current error value then a match is found;
  b. a processing component coupled to the memory, the processing component configured for processing the application; and
  c. a storage component for storing the video.

31. A digital still camera comprising:
  a. an image and video acquisition component for acquiring images and videos;
  b. a memory for storing an application, the application for:
    i. determining a first motion vector and generating a table of error values between a first image and a second image of a video;
    ii. applying a compensating factor to compensate a content of the first image to the second image;
    iii. calculating an additional motion vector including a current error value of a position using the compensating factor; and
    iv. determining if a previous error value of the position is greater than the current error value of the position, and if the previous error value is greater than the current error then repeating applying a compensating factor, calculating an additional motion vector and determining if a previous error value of the position is greater than the current error value of the position, and if the previous error value is less than or equal to the current error value then a match is found;
  c. a processing component coupled to the memory, the processing component configured for processing the application; and
  d. a storage component for storing the images and the videos.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method of estimating motion programmed in a memory of a device comprising:
  a. calculating a first combined motion estimation between a first image and a second image including generating a table of error values;
  b. applying a compensating factor to compensate a content of the first image to the second image;
  c. calculating an additional combined motion estimation including a current error value of a position using the compensating factor; and
  d. determining if a previous error value of the position is greater than the current error value of the position, and if the previous error value is greater than the current error value then repeating applying a compensating factor, calculating an additional combined motion estimation and determining if a previous error value of the position is greater than the current error value of the position, and if the previous error value is less than or equal to the current error value then a match is found.

2. The method of claim 1 wherein calculating the additional combined motion estimation further includes monitoring each position in a search area to determine if the error value reaches a minimum, and if the error value reaches the minimum, the error calculation for the position stops.

3. The method of claim 1 wherein a refinement search is applied when calculating the additional combined motion estimation.

4. The method of claim 3 wherein the refinement search utilizes a search area smaller than a conventional search area.

5. The method of claim 1 wherein calculating the additional combined motion estimation further includes determining if a difference of the error value and a minimum error value is greater than a maximum difference, and if the difference is greater than the maximum difference, the error calculation for the position stops.

6. The method of claim 1 wherein the table of errors is for all positions in a search range.

7. The method of claim 1 wherein a monitoring table is utilized when calculating the additional combined motion estimation, and the monitoring table includes convergence status for each corresponding position, wherein the convergence status determines if a calculated error is bigger than a previous calculated error, and if the calculated error is bigger than the previous calculated error, the error calculation for the position stops.

8. The method of claim 1 wherein the compensating factor includes a blurring difference.

9. The method of claim 1 wherein the content includes an intensity, a contrast or a blurriness.

10. The method of claim 1 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television and a home entertainment system.

11. A system implemented on a device for estimating motion comprising:
  a. a combined motion estimation module for determining a motion vector and determining an error value;
  b. a compensation module operatively coupled to the combined motion estimation module, the compensation module for compensating an image for content changes; and
  c. a determining module operatively coupled to the compensation module, the determining module for determining if a previous error is greater than a current error value and stopping if the previous error value for a position is less than or equal to the current error value and repeating applying a compensating factor and calculating an additional combined motion estimation if the previous error value is greater than the current error value; and d. a processor for executing the combined motion estimation module, the compensation module and the determining module.

12. The system of claim 11 wherein the combined motion estimation module is further configured for monitoring each position in a search area to determine if the error value reaches a minimum, and if the error value reaches the minimum, the error calculation for the position stops.

13. The system of claim 11 wherein the combined motion estimation module is further configured for applying a refinement search.

14. The system of claim 13 wherein the refinement search utilizes a search area smaller than a conventional search area.

15. The system of claim 11 wherein the additional combined motion estimation module is further configured for determining if a difference of an error value and a minimum error value is greater than a maximum difference, and if the difference is greater than the maximum difference, the error calculation for the position stops.

16. The system of claim 11 wherein the combined motion estimation module is further configured for utilizing a monitoring table which includes convergence status for each corresponding position, wherein the convergence status determines if a calculated error is bigger than a previous calculated error, and if the calculated error is bigger than the previous calculated error, the error calculation for the position stops.

17. The system of claim 11 wherein the compensating factor includes a blurring difference.

18. The system of claim 11 wherein the content includes an intensity, a contrast or a blurriness.

19. The system of claim 11 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television and a home entertainment system.

20. A device comprising:
   a. a memory for storing an application, the application for:
      i. calculating a first combined motion estimation between a first image and a second image including generating a table of error values;
      ii. applying a compensating factor to compensate a content of the first image to the second image;
      iii. calculating an additional combined motion estimation including a current error value of a position using the compensating factor; and
      iv. determining if a previous error value of the position is greater than the current error value of the position, and if the previous error value is greater than the current error then repeating applying a compensating factor, calculating an additional combined motion estimation and determining if a previous error value of the position is greater than the current error value of the position, and if the previous error value is less than or equal to the current error value then a match is found; and
   b. a processing component coupled to the memory, the processing component configured for processing the application.

21. The device of claim 20 wherein calculating the additional combined motion estimation further includes monitoring each position in a search area to determine if an error value reaches a minimum, and if the error value reaches the minimum, the error calculation for the position stops.

22. The device of claim 20 wherein a refinement search is applied when calculating the additional combined motion estimation.

23. The device of claim 22 wherein the refinement search utilizes a search area smaller than a conventional search area.

24. The device of claim 20 wherein calculating the additional combined motion estimation further includes determining if a difference of an error value and a minimum error value is greater than a maximum difference, and if the difference is greater than the maximum difference, the error calculation for the position stops.

25. The device of claim 20 wherein the table of errors is for all positions in a search range.

26. The device of claim 20 wherein a monitoring table is utilized when calculating the additional combined motion estimation, and the monitoring table includes convergence status for each corresponding position, wherein the convergence status determines if a calculated error is bigger than a previous calculated error, and if the calculated error is bigger than the previous calculated error, the error calculation for the position stops.

27. The device of claim 20 wherein the compensating factor includes a blurring difference.

28. The device of claim 20 wherein the content includes an intensity, a contrast or a blurriness.

29. The device of claim 20 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television and a home entertainment system.

30. A video capture device comprising:
   a. a memory for storing an application, the application for:
      i. determining a first motion vector and generating a table of error values between a first image and a second image of a video;
      ii. applying a compensating factor to compensate a content of the first image to the second image;
      iii. calculating an additional motion vector including a current error value of a position using the compensating factor; and
      iv. determining if a previous error value of the position is greater than the current error value of the position, and if the previous error value is greater than the current error then repeating applying a compensating factor, calculating an additional motion vector and determining if a previous error value of the position is greater than the current error value of the position, and if the previous error value is less than or equal to the current error value then a match is found;
   b. a processing component coupled to the memory, the processing component configured for processing the application; and
   c. a storage component for storing the video.

31. A digital still camera comprising:
   a. an image and video acquisition component for acquiring images and videos;
   b. a memory for storing an application, the application for:
      i. determining a first motion vector and generating a table of error values between a first image and a second image of a video;
      ii. applying a compensating factor to compensate a content of the first image to the second image;

iii. calculating an additional motion vector including a current error value of a position using the compensating factor; and
iv. determining if a previous error value of the position is greater than the current error value of the position, and if the previous error value is greater than the current error then repeating applying a compensating factor, calculating an additional motion vector and determining if a previous error value of the position is greater than the current error value of the position, and if the previous error value is less than or equal to the current error value then a match is found;
c. a processing component coupled to the memory, the processing component configured for processing the application; and
d. a storage component for storing the images and the videos.

32. The video capture device of claim 30 wherein calculating the additional combined motion estimation further includes monitoring each position in a search area to determine if an error value reaches a minimum, and if the error value reaches the minimum, the error calculation for the position stops.

33. The video capture device of claim 30 wherein a refinement search is applied when calculating the additional combined motion estimation.

34. The video capture device of claim 33 wherein the refinement search utilizes a search area smaller than a conventional search area.

35. The video capture device of claim 30 wherein calculating the additional combined motion estimation further includes determining if a difference of an error value and a minimum error value is greater than a maximum difference, and if the difference is greater than the maximum difference, the error calculation for the position stops.

36. The video capture device of claim 30 wherein the table of errors is for all positions in a search range.

37. The video capture device of claim 30 wherein a monitoring table is utilized when calculating the additional combined motion estimation, and the monitoring table includes convergence status for each corresponding position, wherein the convergence status determines if a calculated error is bigger than a previous calculated error, and if the calculated error is bigger than the previous calculated error, the error calculation for the position stops.

38. The video capture device of claim 30 wherein the compensating factor includes a blurring difference.

39. The video capture device of claim 30 wherein the content includes an intensity, a contrast or a blurriness.

40. The digital still camera of claim 31 wherein calculating the additional combined motion estimation further includes monitoring each position in a search area to determine if an error value reaches a minimum, and if the error value reaches the minimum, the error calculation for the position stops.

41. The digital still camera of claim 31 wherein a refinement search is applied when calculating the additional combined motion estimation.

42. The digital still camera of claim 41 wherein the refinement search utilizes a search area smaller than a conventional search area.

43. The digital still camera of claim 31 wherein calculating the additional combined motion estimation further includes determining if a difference of an error value and a minimum error value is greater than a maximum difference, and if the difference is greater than the maximum difference, the error calculation for the position stops.

44. The digital still camera of claim 31 wherein the table of errors is for all positions in a search range.

45. The digital still camera of claim 31 wherein a monitoring table is utilized when calculating the additional combined motion estimation, and the monitoring table includes convergence status for each corresponding position, wherein the convergence status determines if a calculated error is bigger than a previous calculated error, and if the calculated error is bigger than the previous calculated error, the error calculation for the position stops.

46. The digital still camera of claim 31 wherein the compensating factor includes a blurring difference.

47. The digital still camera of claim 31 wherein the content includes an intensity, a contrast or a blurriness.

* * * * *

UNITED STATES PATENT AND TRADEMARK OFFICE
CERTIFICATE OF CORRECTION

Page 1 of 1

PATENT NO.       : 8,179,474 B2
APPLICATION NO.  : 12/553021
DATED            : May 15, 2012
INVENTOR(S)      : Kensuke Miyagi and Pingshan Li It is certified that error appears in the above-identified patent and that said Letters Patent is hereby corrected as shown below:

IN THE DRAWINGS
Replace Fig. 8 with drawing attached below.

Signed and Sealed this
Tenth Day of July, 2012

David J. Kappos
*Director of the United States Patent and Trademark Office*